Y. M. CRÉCHRIOU.
AUTOMOBILE FENDER.
APPLICATION FILED OCT. 30, 1909.
970,892. Patented Sept. 20, 1910.
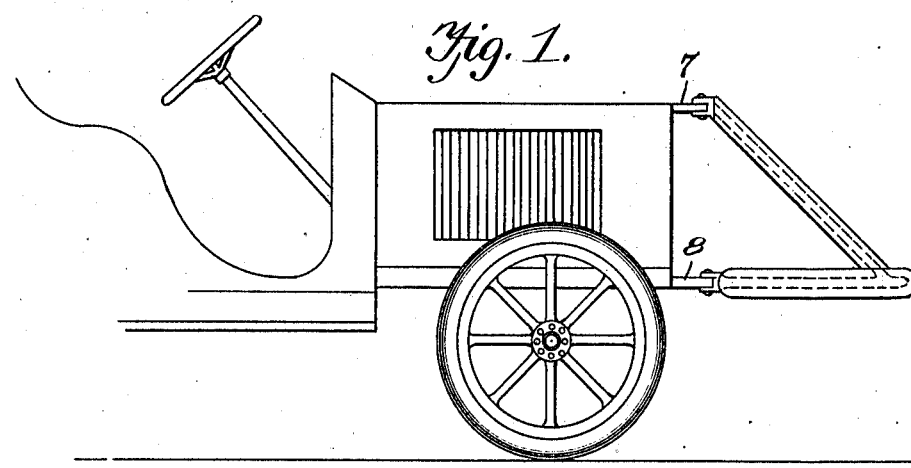
Fig. 1.
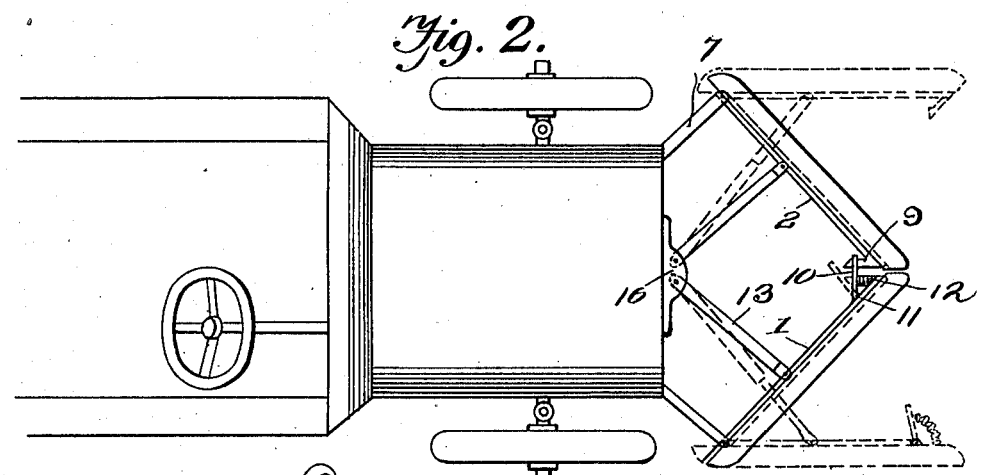
Fig. 2.
Fig. 3.
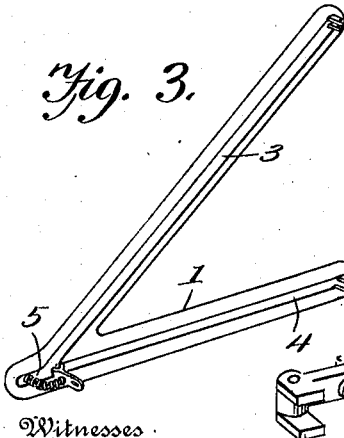
Fig. 4.
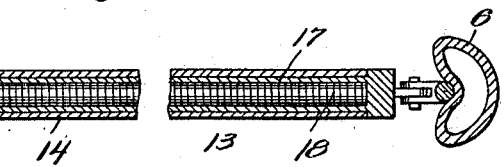
Fig. 5
Witnesses
William C. Linton.
D. W. Gould.
Inventor
Yves Marie Créchriou.
By Victor J. Evans
Attorney

UNITED STATES PATENT OFFICE.

YVES MARIE CRÉCHRIOU, OF MONTEREY, CALIFORNIA.

AUTOMOBILE-FENDER.

970,892.  Specification of Letters Patent.  Patented Sept. 20, 1910.

Application filed October 30, 1909. Serial No. 525,461.

*To all whom it may concern:*

Be it known that I, YVES M. CRÉCHRIOU, a citizen of the United States, residing at Monterey, in the county of Monterey and State of California, have invented new and useful Improvements in Automobile-Fenders, of which the following is a specification.

The invention relates to an improvement in fenders, and is particularly directed to a fender adapted for use in connection with automobiles and similar vehicles.

The main object of the present invention is the provision of a fender including independent members adapted for connection when in normal position and for automatic separation when engaging a person or object to force said person or object from the path of a vehicle.

The invention will be described in the following specification, reference being had particularly to the accompanying drawings, in which :—

Figure 1 is a view in side elevation illustrating the application of my improvement. Fig. 2 is a plan of the same. Fig. 3 is a perspective of one of the fender members. Fig. 4 is an enlarged longitudinal section through the operating means and adjacent fender member. Fig. 5 is a broken perspective illustrating the connection for normally holding the members in set relation.

Referring particularly to the accompanying drawings, my improved fender comprises members 1 and 2, preferably of duplicate construction and each including frame bars 3 and 4 arranged at an angle to each other, the frame bar 4, which forms the horizontal bar of the fender member when in place, being extended beyond the juncture of the inclined or upper bar 3 in the form of an extension 5. To the relatively outer side or surface of each frame there is secured a buffer or guard section 6, preferably in the form of a pneumatic section following the outline of the respective bars and adapted to be inflated to form an air cushion throughout the length of and on the relatively outer side of each fender member. The members are secured to the forward portion of the automobile, the relatively inner end of the bar 3 being pivotally supported on an arm 7 projecting from the automobile and the relatively inner end of the bar 4 being similarly supported upon an arm 8, the respective arms being so arranged that the bar 4 of the fender member projects horizontally from and in advance of the automobile, while the bar 3 extends upwardly from near the forward end of the bar 4, as clearly shown in Fig. 1.

The relatively free ends or projections 5 of the respective members 1 and 2 are adapted for connection through the medium of a hook 9 projecting from one of said members and a latch 10 projecting from the other of said members, said latch being in the form of a hasp to engage the hook 9 and being pivotally mounted at 11 on the particular member and normally engaged by a coil spring 12 carried by said member, said spring being so arranged that when the latch 10 is in engagement with the hook 9 the spring 12 is under tension, as clearly shown in Fig. 2. The respective members are of such lengths that when connected through the medium of a hook and latch a space is provided between the proximate ends of said members, whereby to permit independent movement of either member toward the other.

The members when in latched or normal position are each held under tension through the medium of an operating member 13 comprising a sleeve-like outer section 14 pivotally connected at its relatively rear end, as at 15, to a frame plate 16 secured to the automobile, said frame plate being of a size to accommodate both operating members. Within the sleeve 14 is telescopically arranged a second sleeve 17, and housed within the latter sleeve and bearing against the head of said sleeve and the head of the sleeve 14 is a coil spring 18, of sufficient strength to swing the particular fender member on its pivot with the force desired. The inner sleeve 18 is pivotally connected to the horizontal bar 4 of the particularly fender member, the arrangement of the parts being such that when the respective fender members are in locked position the sleeve 17 is fully telescoped within the sleeve 15 and said members are held against the full tension of the springs 18.

With the respective fender members in normal position it will be noted that they form a triangular guard having the apex centrally disposed of and in advance of the automobile, the bars 7 and 8 being of such lengths as to maintain the relatively rear ends of the fender members a slight distance outwardly beyond the automobile wheels. With the members of the fender in latched position, as shown in full lines in Fig. 2, the impact of said members with a body or object will cause a relatively rearward or inward movement of the free end of the particular member. This movement of the particular member will cause the hook or latch, as the case may be, to be moved to dispose the opening in the latch in position to ride off the hook, which disengagement is immediately accomplished by the spring 12. The fender members are then freed from connection and under the influence of the operating members 13 are immediately projected to their operative positions, (shown in dotted lines in Fig. 2,) in which position they are practically in alinement with the automobile wheels, thereby effectively brushing any body or object beyond possibility of injury from said wheels.

If desired, as in long tours or on roads where little if any use will be found for the fender, the latch may be secured against disconnection by any convenient means. The structural details of the members are to be as light as is consistent with the strength required, it being understood that the connection between the frame bars 7 and 8 are to be such as to permit their convenient removal when it is desired to wholly detach the fender from the automobile.

Having thus described the invention what is claimed as new, is:—

1. A fender comprising two members, means for pivotally supporting the relatively rear ends of said members, manually operable means for connecting the forward ends of said members to arrange the members at an angle to each other, means for automatically releasing the forward ends of said members upon the engagement of either member with an object, telescopic sections connected respectively to the members and to the vehicle, and a spring tensioned to force said sections in relatively opposite directions.

2. A fender including two members, each of said members including upper and lower frame bars arranged at an angle with respect to each other and meeting adjacent their forward ends, means for pivotally connecting the rear end of each frame bar to the vehicle to permit independent lateral movement of said member, means for connecting the forward ends of the members together so as to dispose said members at a relatively divergent angle toward the vehicle, means for automatically releasing the forward ends of said members upon the movement of either member toward the other member operating means including telescopic sections arranged between each member and the vehicle, one of the sections being connected to the member and the other section connected to the vehicle, and a spring arranged to operate the sections in opposite directions, said sections being disposed to tension the spring when the respective members are connected at their forward ends.

3. A fender comprising two members, means for pivotally supporting the rear ends of the members, a hook projecting from the forward end of one of the members, a latch pivotally connected to the forward end of the other of said members and adapted to engage the hook to connect the members at an angle to each other with their forward ends in slightly spaced relation, a spring carried by one of the members to operate the latch in a direction away from the hook, and spring operated means arranged between each member and the vehicle to swing said member on its pivotal connection upon the disconnection of the latch and hook.

In testimony whereof I affix my signature in presence of two witnesses.

YVES MARIE CRÉCHRIOU.

Witnesses:
C. E. COLBURN,
G. O. DE WITT.